US012492012B2

(12) United States Patent
Sakamoto et al.

(10) Patent No.: US 12,492,012 B2
(45) Date of Patent: Dec. 9, 2025

(54) SYSTEM FOR NOISE CONTROL IN AIR MOBILITY UNITIZING AN ARRAY OF ACOUSTIC SCATTERERS

(71) Applicant: Toyota Motor Engineering & Manufacturing North America, Inc., Plano, TX (US)

(72) Inventors: Mizuki Sakamoto, Toyota (JP); Tomohiro Miwa, Toyota (JP); Reimi Emoto, Nagoya (JP); Xiaoshi Su, Ann Arbor, MI (US); Debasish Banerjee, Ann Arbor, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 370 days.

(21) Appl. No.: 17/897,391

(22) Filed: Aug. 29, 2022

(65) Prior Publication Data
US 2024/0067358 A1 Feb. 29, 2024

(51) Int. Cl.
*B64F 1/26* (2006.01)
*E01F 3/00* (2006.01)

(52) U.S. Cl.
CPC . *B64F 1/26* (2013.01); *E01F 3/00* (2013.01)

(58) Field of Classification Search
CPC .................................... B64F 1/26; E01F 3/00
USPC .......................... 181/210; 244/114 B, 114 R
See application file for complete search history.

(56) References Cited

U.S. PATENT DOCUMENTS

| 5,426,267 | A | 6/1995 | Underhill et al. |
| 10,714,070 | B1 * | 7/2020 | Su .......................... G10K 11/175 |
| 10,878,794 | B2 * | 12/2020 | Hakuta ................ G10K 11/168 |
| 11,535,989 | B2 * | 12/2022 | Sarpotdar .............. G05B 15/02 |
| 11,545,128 | B2 * | 1/2023 | Su .......................... G10K 11/162 |
| 11,555,280 | B2 * | 1/2023 | Su .......................... E01F 8/0047 |
| 11,776,522 | B2 * | 10/2023 | Su .......................... G10K 11/162 |
| | | | 181/286 |
| 2021/0142773 | A1 | 5/2021 | Su et al. |

FOREIGN PATENT DOCUMENTS

| CN | 106205590 A | 12/2016 | |
| CN | 113123261 A * | 7/2021 | |
| WO | WO-2016173502 A1 * | 11/2016 | ........... G10K 11/172 |

OTHER PUBLICATIONS

Machine translation of CN-113123261-A (Year: 2021).*
(Continued)

*Primary Examiner* — Forrest M Phillips
*Assistant Examiner* — Jennifer B Olson
(74) *Attorney, Agent, or Firm* — Christopher G. Darrow; Darrow Mustafa PC

(57) ABSTRACT

A system for isolating sound generated by an aircraft utilizing a helipad may include a plurality of acoustic scatterers being disposed adjacent to at least a portion of a perimeter of the helipad. Each of the plurality of acoustic scatterers include channels having an open end and a terminal end. Additionally, each of the plurality of acoustic scatterers has an acoustic monopole response and an acoustic dipole response with a resonant frequency that is substantially similar to one another.

20 Claims, 6 Drawing Sheets

(56) References Cited

OTHER PUBLICATIONS

Elliott A. S. et al., "Omnidirectional acoustic absorber with a porous core and a metamaterial matching layer". J. Appl. Phys. 115, 204902 (2014). https://usir.salford.ac.uk/id/eprint/34529/1/jap_2014.pdf, 15 pp.

Liang Z. et al., "Extreme acoustic metamaterial by coiling up space". Phys. Rev. Lett. 108, 114301 (2012). https://tinyurl.com/5cd5u6v9, pp. 1-4.

Cheng, Y. et al., "Ultra-sparse metasurface for high reflection of low frequency sound based on artificial Mie resonances", Nature Materials, . 14, 1013-1019 (2015).http://english.ioa.cas.cn/as/201509/W020150901625104407576.pdf, pp. 1-8.

Ghaffarivardavagh, R. et al., "Ultra-open acoustic metamaterial silencer based on Fano-like interface", Phys. Rev. B 99, 024302 (2019), pp. 1-10.

Lee, T., et al., "Ultrasparse acoustic absorbers enabling fluid flow and visible-light controls." Physical Review Applied 11, No. 2 (2019): 024022. https://tinyurl.com/d5s5jraz, pp. 1-13.

Long, H. et al., "Multiband quasi-perfect low-frequency sound absorber based on double-channel Mie resonator." Applied Physics Letters 112, No. 3 (2018): 033507. https://tinyurl.com/2p83s43d, pp. 1-5.

\* cited by examiner

SYSTEM FOR NOISE CONTROL IN AIR MOBILITY UNITIZING AN ARRAY OF ACOUSTIC SCATTERERS

TECHNICAL FIELD

The present disclosure generally relates to systems for isolating unwanted noise and, more particularly, systems for isolating unwanted noise generated near a helipad.

BACKGROUND

The background description provided is to generally present the context of the disclosure. Work of the inventors, to the extent it may be described in this background section, and aspects of the description that may not otherwise qualify as prior art at the time of filing, are neither expressly nor impliedly admitted as prior art against the present technology.

Helipads are generally landing areas or platforms for helicopters and vertical takeoff and landing (VTOL) aircraft. During the takeoff and/or landing of these types of aircraft at helipads, significant levels of low-frequency noise can be generated. There are several different solutions for managing low-frequency noises, but many have drawbacks. For example, one solution requires the use of high reflection material, such as walls that surround or partially surround the helipad. While structures such as these can partially contain noise generated during takeoff and/or landing, noise contained within these structures, such as near the helipad, can generally increase to unsafe levels. Further still, enclosing the helipad area using walls has other drawbacks as well. Moreover, enclosing the helipad area with a wall impacts the aircraft's ability to sufficiently move air to create lift.

For example, referring to FIG. 1, illustrated is a prior art solution 10 showing a helipad 14 having a landing area 16 for the landing/takeoff of the aircraft 12. In this example, the aircraft 12 can be any VTOL type aircraft, such as a helicopter, drone, and the like. Surrounding the perimeter of the helipad 14 is a wall 18, which essentially encloses the helipad 14. The wall 18 can limit the transmission of sound from within the helipad 14 to the area outside of the helipad 14. However, the wall 18 essentially acts as a reflector, reflecting sound generated by the operation of the aircraft 12 back into the helipad 14, greatly increasing the amount of noise within the helipad 14.

Additionally, the amount of air capable of moving within the helipad 14 is also restricted by the wall 18. When this occurs, the amount of lift generated by the rotation of the rotors of the aircraft 12 can be significantly decreased, potentially causing a dangerous situation where the aircraft 12 suddenly and unexpectedly descends, potentially resulting in a crash.

SUMMARY

This section generally summarizes the disclosure and is not a comprehensive disclosure of its full scope or all its features.

In one embodiment, a system for absorbing sound generated by an aircraft utilizing a helipad includes a plurality of acoustic scatterers being disposed adjacent to at least a portion of a perimeter of the helipad. Each of the plurality of acoustic scatterers include channels having an open end and a terminal end. Additionally, each of the plurality of acoustic scatterers has an acoustic monopole response and an acoustic dipole response with a resonant frequency that is substantially similar to one another.

In another embodiment, a system for absorbing sound generated by an aircraft utilizing a helipad includes a plurality of acoustic scatterers being disposed adjacent to at least a portion of a perimeter of the helipad and are separated from one another by a distance less than approximately twice the wavelength of the sound generated by the aircraft utilizing the helipad. Each of the plurality of acoustic scatterers has an acoustic monopole response and an acoustic dipole response with a resonant frequency that is substantially similar to one another and is substantially equal to the frequency of the sound generated by the aircraft utilizing the helipad.

In yet another embodiment, a system for absorbing a target sound includes a plurality of acoustic scatterers separated from one another by a distance less than approximately twice the wavelength of the target sound. Each of the plurality of acoustic scatterers has an acoustic monopole response and an acoustic dipole response with a resonant frequency that is substantially similar to one another and is substantially equal to the frequency of the target sound.

Further areas of applicability and various methods of enhancing the disclosed technology will become apparent from the description provided. The description and specific examples in this summary are intended for illustration only and are not intended to limit the scope of the present disclosure.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements, or multiple elements may be designed as one element. In some embodiments, an element shown as an internal component of another element may be implemented as an external component and vice versa. Furthermore, elements may not be drawn to scale

DETAILED DESCRIPTION

Described herein are systems for absorbing sound generated by an aircraft utilizing a helipad. In one example, the system utilizes a plurality of acoustic scatterers forming an array that is disposed adjacent to at least a portion of a perimeter of the helipad. The acoustic scatterers may be separated from one another at a distance that is approximately less than twice the wavelength (λ) of the frequency of the sound generated by the aircraft utilizing the helipad. In one particular example, the distance separating the acoustic scatterers may be between 0.5 to 1.0 of the wavelength (λ) of the frequency of the sound generated by the aircraft utilizing the helipad.

Figure 1:
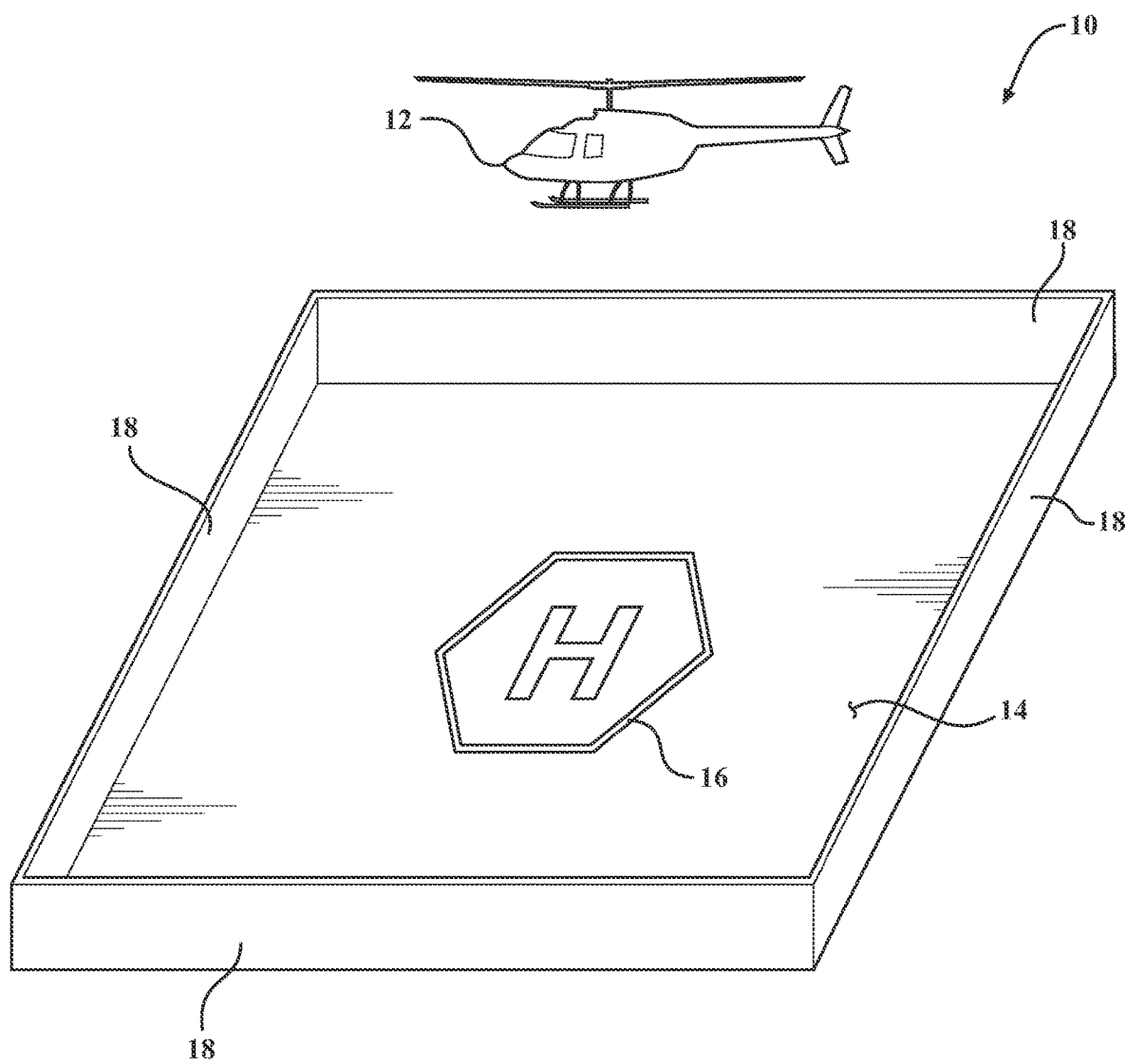
FIG. 1 illustrates a prior art solution for containing sound generated during the takeoff and/or landing of an aircraft at a helipad.

By utilizing an array of acoustic scatterers, as opposed to a wall, such as shown in FIG. 1, sound generated by the aircraft can be significantly absorbed, reducing the impact of the sound outside the perimeter of the helipad, as well as preventing significant increases in sound inside the perimeter of the helipad. Additionally, because there is a separation between each of the acoustic scatterers that form the array, air can freely flow into and out of the helipad, preventing and/or minimizing any negative impact on the operation of the aircraft.

Figure 2:
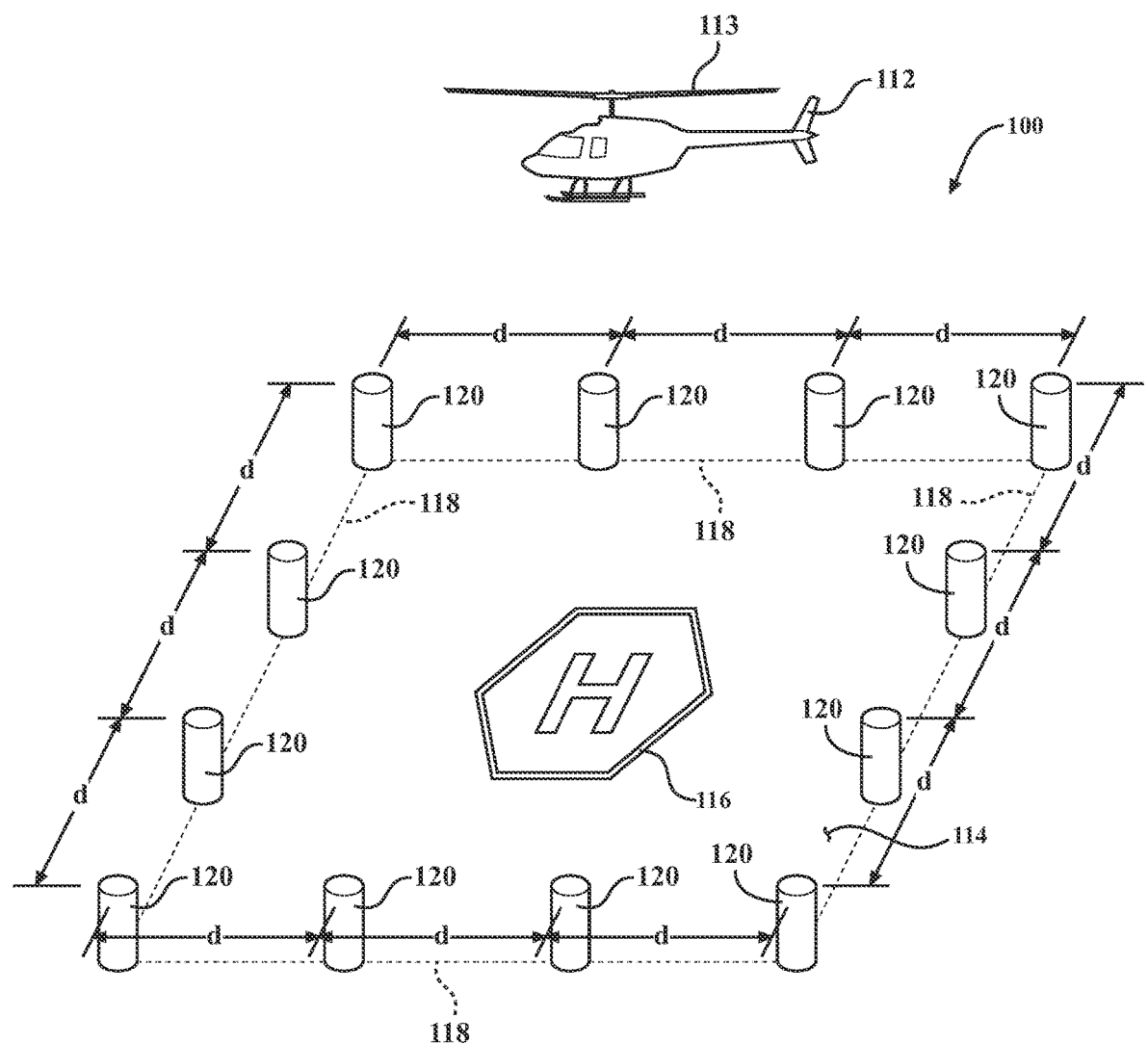
FIG. 2 illustrates an example of a system for absorbing sound generated during the takeoff and/or landing of an aircraft at a helipad utilizing an array of acoustic scatterers.

Referring to FIG. 2, illustrated is an example 100 showing a helipad 114 having a perimeter 118 in the landing area 116. In this example, the perimeter 118 of the helipad 114 is shown to be rectangular in shape. However, it should be understood that the helipad 114 can take any one of a number of different shapes. Located within the perimeter 118 of the helipad 114 is a landing area 116 demarking where aircraft can land and/or take off from the helipad 114. The landing area 116 can be located anywhere within the helipad 114, defined by the perimeter 118. In some cases, the landing area 116 may be located within the centralized area of the helipad 114 but could also be located closer to the perimeter 118. Furthermore, the helipad 114 may have a single landing area, such as the landing area 116, or may have multiple landing areas located within the helipad 114.

Generally, aircraft utilizing the helipad 114 can include helicopters, compound helicopters, gyrocopters, and/or VTOL aircraft. VTOL and/or short-VTOL (SVTOL) aircraft can takeoff and/or land in a substantially vertical direction, such as the Bell Boeing V-22 Osprey, Boeing AV-8B Harrier II, Lockheed Martin F-35 Lightning II, and the like. The aircraft utilizing the helipad can be traditional manned aircraft or can be unmanned aircraft, such as drones.

In the example 100, shown in FIG. 2, the aircraft is shown as a helicopter 112. The helicopter 112 includes a rotor 113 that can lift and/or thrust. Generally, the rotation of the rotor 113 can create low-frequency sounds, sometimes referred to as noise. In some cases, the loudest noise generated by a helicopter is produced by aerodynamic vortices created when the rotor 113 rotates through the air. When the following blade of the rotor 113 hits those vortices, the blade creates a loud slap or snap sound. This noise becomes more pronounced when the helicopter 112 is nearer to the helipad 114.

In the example 100, a plurality of acoustic scatterers 120 are generally placed along the perimeter 118 of the helipad 114. In this example, the plurality of acoustic scatterers form an array that generally surrounds the helipad 114 along the perimeter 118. However, it should also be understood that the acoustic scatterers 120 may only be placed along a portion of the perimeter 118. Instead of surrounding the helipad 114 with the acoustic scatterers 120, only a portion of the perimeter 118 may be populated with the acoustic scatterers 120.

The plurality of acoustic scatterers 120 are shown to be separated from each other by a distance d. As such, one acoustic scatter is generally located from another acoustic scatter by the distance d to generally follow along at least a portion of the perimeter 118. The distance d can vary from application to application but is generally less than twice the wavelength (λ) of the frequency of the target sound to be absorbed. In one particular example, the distance d may be approximately between 0.5 and 1.0 of the wavelength (λ) of the frequency of the target sound to be absorbed. As mentioned before, the target sound may be the sound generated by the helicopter 112 when approaching/departing the helipad 114. By having the distance d between each of the acoustic scatterers 120, air can flow freely into and out of the helipad 114, preventing any negative impact on the lift generated by the rotors 113 of the helicopter 112 as the helicopter 112 approaches/departs the helipad 114.

Figure 3:
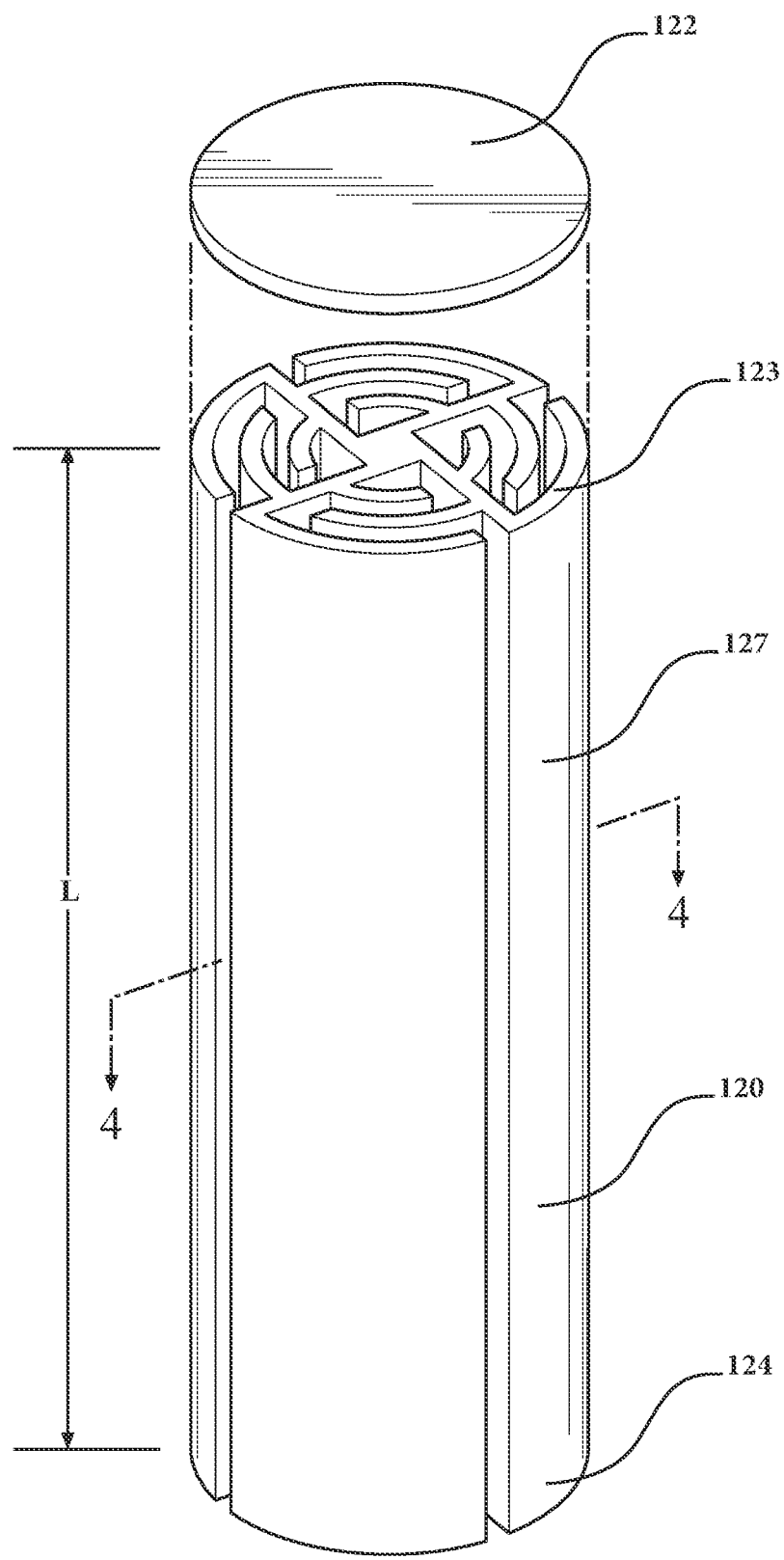
FIG. 3 illustrates a more detailed view of one of the acoustic scatterers forming the array of acoustic scatterers of FIG. 2.

FIG. 3 illustrates a more detailed view of one of the acoustic scatterers 120 shown in FIG. 2. The acoustic scatterer 120 may be similar to the acoustic scatterer(s) described in U.S. Pat. No. 10,714,070 and U.S. Pat. App. Pub. No. 2021/0142773, both to Su et al., the contents of both are herein incorporated by reference in their entirety.

In this example, the acoustic scatterer 120 has a length L that generally extends in a direction perpendicular to a support surface, such as the surface of the helipad 114. The length L can vary from application to application but is generally based on determinations regarding how and where the sound should be absorbed. For example, if several single-story buildings are located near the helipad 114, the length L of the acoustic scatterer 120 may be slightly longer than the height of the single-story buildings. However, if nearby buildings are taller, the length L of the acoustic scatterer 120 may be increased.

The acoustic scatterer 120 generally has a housing 127 that defines the overall shape of the acoustic scatterer 120. Generally, the housing 127 may be symmetrical across the width of the housing 127. However, the housing 127 may take any one of a number of different shapes. As will be described later, the acoustic scatterer 120 includes a plurality of channels. To prevent the channels from experiencing environmental damage, such as rain, ice, snow, dirt, etc., one or both ends 123 and/or 124 may be capped with a protective covering 122. The acoustic scatterers 120A and/or 120B may be made using any one of several different materials. For example, the acoustic scatterer 120 may be made from an acoustically hard material, such as plastic, silicon, glass, and/or metals.

The acoustic scatterer 120 may have an acoustic monopole response and an acoustic dipole response. An acoustic monopole radiates sound waves in all directions. The radiation pattern of monopole generally has no angle dependence for both magnitude and phase of the sound pressure. The radiation of acoustic dipole has an angle dependence $e^{i\theta}$, where θ is the polar angle in 2D. The pressure fields have the same magnitude and the opposite phase at the same distance along the two opposite radiation directions. The monopole response is equivalent to the sound radiated from a pulsating cylinder whose radius expands and contracts sinusoidally. The dipole response is equivalent to the sound radiated from two pulsating cylinders separated from each other by a small distance, the two pulsating cylinders radiate sound with the same strength but opposite phase. The acoustic dipole response and the acoustic monopole response of the acoustic scatterer 120 may have substantially similar resonant frequencies. The term "substantially similar" regarding resonant frequencies should be understood to mean that the resonant frequencies may differ by approximately 10% or less.

Figure 4A:
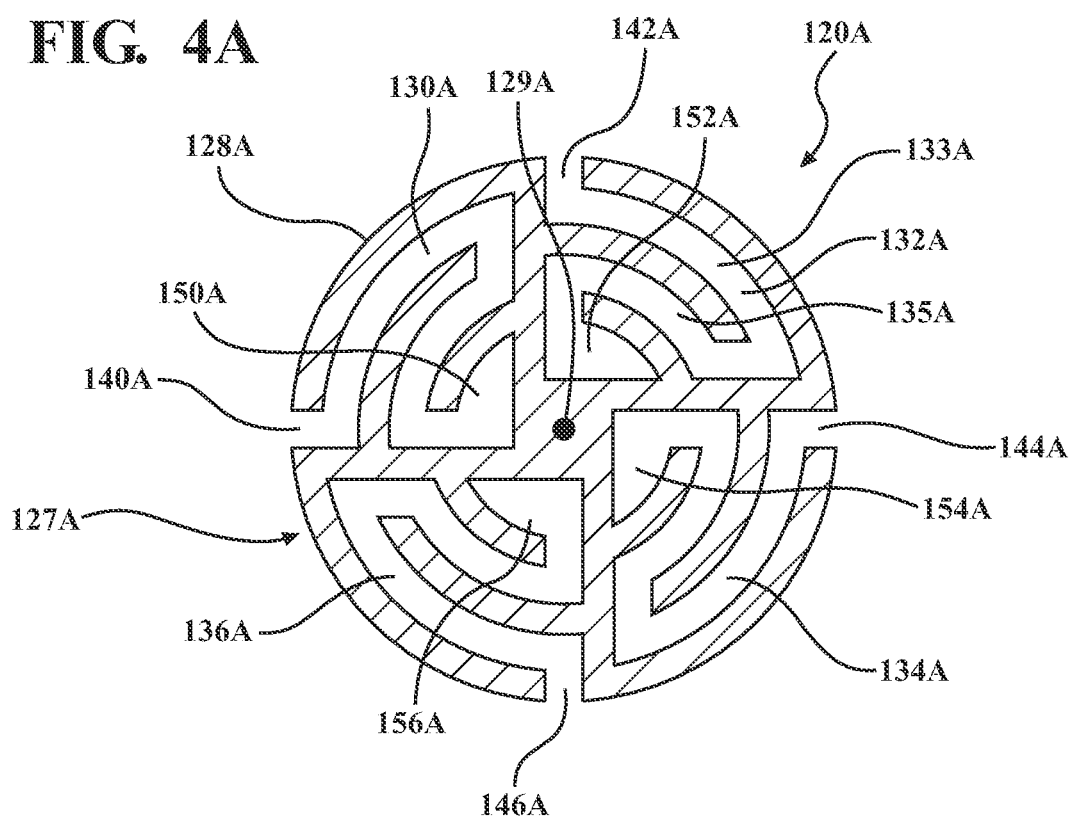
FIGS. 4A and 4B illustrate cutaway views of the acoustic scatter of FIG. 3, generally taken along lines 4-4.
Figure 4B:
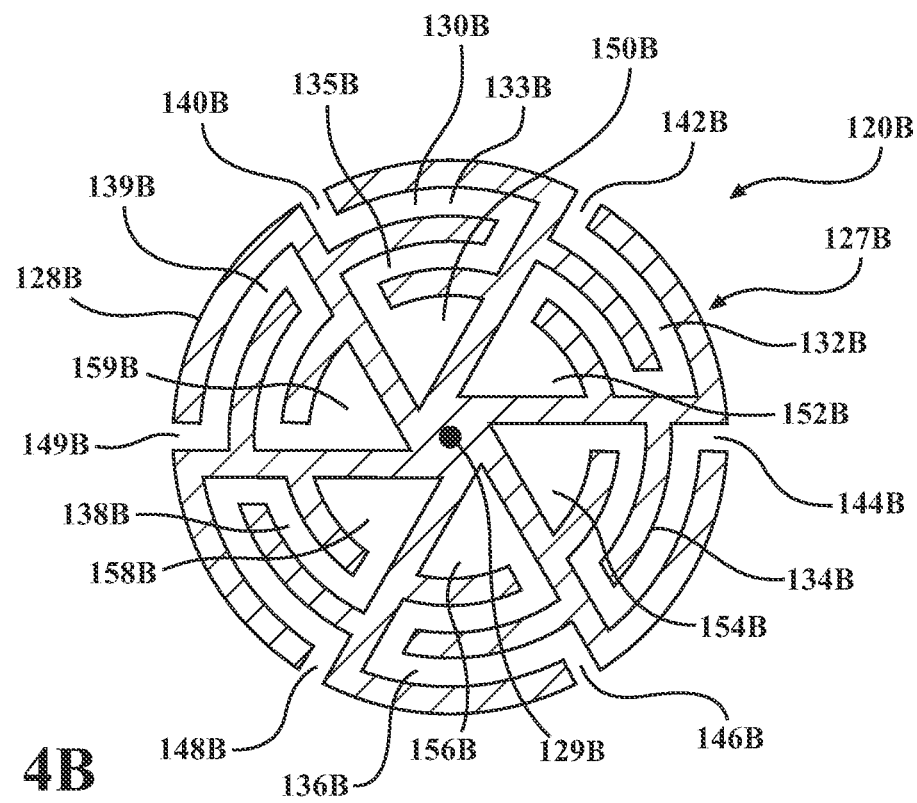

Referring to FIGS. 4A and 4B, cross-sections, generally taken along lines 4-4 of FIG. 3, of different examples of acoustic scatterers 120A and 120B are shown. It should be understood that the different designs of the acoustic scatterers 120A and 120B shown in FIGS. 4A and 4B are merely examples. The acoustic scatterers 120 could take any one of a number of different designs, not just those shown and described in this disclosure. Each of the acoustic scatterers 120A and 120B may have housings 127A and 127B that are generally symmetrical in shape across the width of the housings 127A and 127B. Each housing 127A and 127B generally define a perimeter 128A and 128B. The generally symmetrical in shape across the width of the housings 127A and 127B may be substantially circular in shape, as shown. However, it should be understood that any one of a number of different shapes could be utilized.

The acoustic scatterers 120A and 120B may have a plurality of channels. For example, the acoustic scatterer 120A has four channels 130A, 132A, 134A, and 136A. As such, the acoustic scatterer 120A of FIG. 4A is a four-channel acoustic scatterer. The acoustic scatterer 120B of FIG. 4B has six channels 130B, 132B, 134B, 136B, 138B, and 139B. As such, the acoustic scatterer 120B of FIG. 4B is a six-channel acoustic scatterer. It should be understood that any one of a number of channels may be utilized in the acoustic scatterers 120A and/or 120B.

The acoustic scatterer 120A, as stated previously, is a four-channel acoustic scatterer and therefore has four channels 130A, 132A, 134A, and 136A. Each of the four channels 130A, 132A, 134A, and 136A have an open end 140A, 142A, 144A, and 146A, respectively, located adjacent to the outer perimeter 128A. In addition, each of the four channels 130A, 132A, 134A, and 136A have terminal ends 150A, 152A, 154A, and 156A, respectively. The terminal ends 150A, 152A, 154A, and 156A may be located near a center 129A of the acoustic scatterer 120A. The terminal ends 150A, 152A, 154A, and 156A may be separate from each other and may not be in fluid communication with each other.

The volumes of the channels 130A, 132A, 134A, and 136A may be substantially equal to each other. Additionally, the overall shape of the channels 130A, 132A, 134A, and 136A across the width of the acoustic scatterer 120A may be substantially similar in shape and/or design.

Regarding the design of the channels 130A, 132A, 134A, and 136A, the channels may have a general zigzag type form. For example, with regard to the channel 132A, the channel may have a zigzag, wherein one portion 133A of the channel 132A runs partially or substantially parallel to another portion 135A of the channel 132A. However, it should be understood that the design of the channel may vary greatly and may not necessarily be a zigzag type design. Additionally, this exact type of design may be such that one portion of the channel does not run substantially parallel to another portion of the channel, as shown in the example of FIG. 4A.

Turning our attention to the acoustic scatterer 120B, as stated previously, the acoustic scatterer 120B is a six-channel acoustic scatterer and therefore includes channels 130B, 132B, 134B, 136B, 138B, and 139B. Each of the six channels 130B, 132B, 134B, 136B, 138B, and 139B have an open end 140B, 142B, 144B, 146B, 148B, and 149B, respectively, located adjacent to the outer perimeter 128B. In addition, each of the six channels 130B, 132B, 134B, 136B, 138B, and 139B have terminal ends 150B, 152B, 154B, 156B, 158B, and 159B, respectively. The terminal ends 150B, 152B, 154B, 156B, 158B, and 159B may be located near a center 129B of the acoustic scatterer 120B. The terminal ends 150B, 152B, 154B, 156B, 158B, and 159B may be separate from each other and may not be in fluid communication with each other.

The volumes of the channels 130B, 132B, 134B, 136B, 138B, and 139B may be substantially equal to each other. Additionally, the overall shape of the channels 130B, 132B, 134B, 136B, 138B, and 139B across the width of the acoustic scatterer 120B may be substantially similar in shape and/or design.

Regarding the design of the channels 130B, 132B, 134B, 136B, 138B, and 139B, the channels may have a general zigzag type form. For example, with regard to the channel 130B, the channel may have a zigzag, wherein one portion 133B of the channel 130B runs partially or substantially parallel to another portion 135B of the channel 130B. However, it should be understood that the design of the channel may vary greatly and may not necessarily be a zigzag type design. Additionally, this exact type of design may be such that one portion of the channel does not run substantially parallel to another portion of the channel, as shown in the example of FIG. 4B.

Figure 5A:
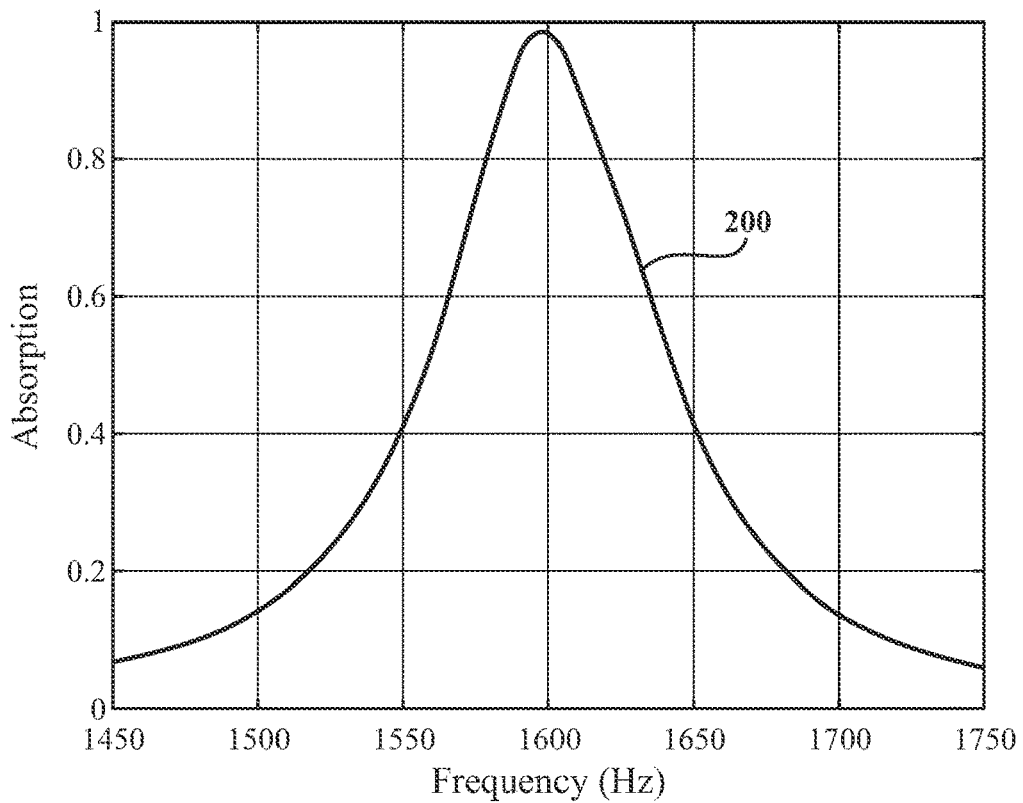
FIGS. 5A and 5B illustrate charts of the absorption and sound transmission loss, respectively, of one of the acoustic scatterers forming the array of acoustic scatterers of FIG. 2.

Referring to FIG. 5A, illustrated is the absorption coefficient 200 of the acoustic scatterer 120B that targets sounds with a frequency of approximately 1580 Hz. In this example, the acoustic scatterer 120B has an acoustic monopole response and an acoustic dipole response with substantially equal resonant frequencies. In this example, the resonant frequencies are approximately 1580 Hz. As can be seen in the chart of FIG. 5A, near-total absorption is achieved at 1580 Hz and at least a 40% absorption between 1550 Hz and 1650 Hz.

Figure 5B:
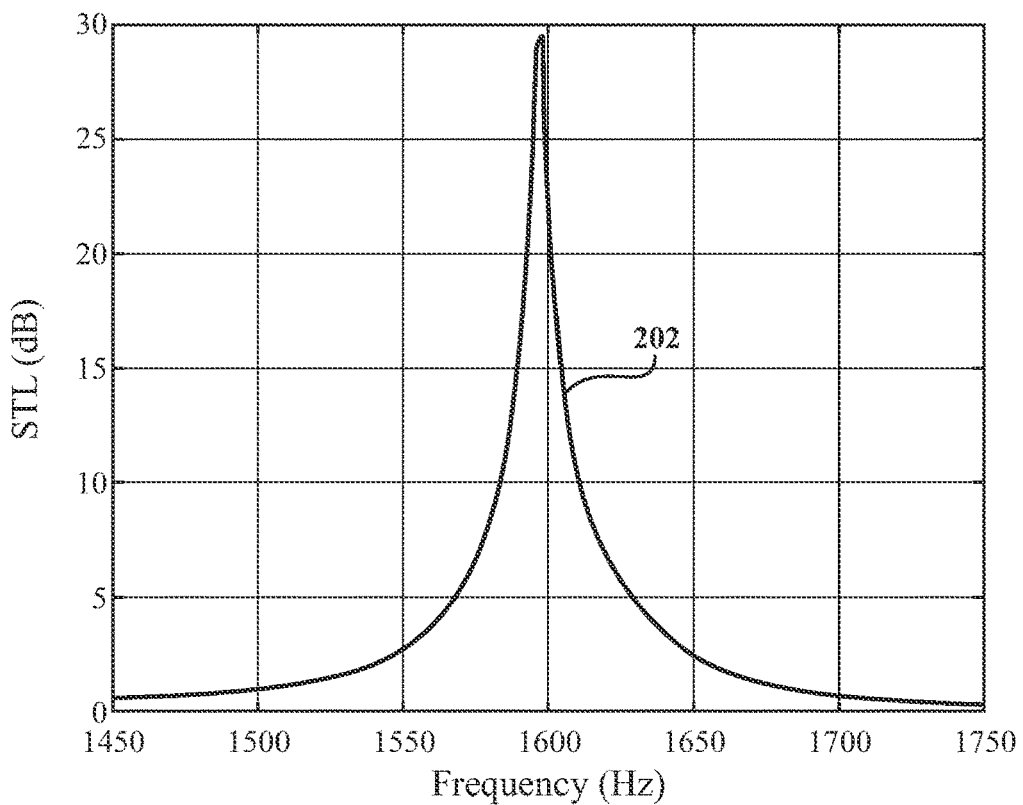

Referring to FIG. 5B, illustrated is the sound transmission loss (STL) 202 of the acoustic scatterer 120B. Like before, the acoustic scatterer 120B has an acoustic monopole response and an acoustic dipole response with substantially equal resonant frequencies. In this example, the resonant frequencies are approximately 1580 Hz. Here, a 30 dB STL is achieved at approximately 1580 Hz.

As mentioned before, when walls surround helipads, the walls can cause some STL from the area within the helipad to the area outside the helipad. However, noise within the helipad is reflected off the walls and is redirected inside the helipad, which generally causes an increase in unwanted noise within the helipad. While areas outside the helipad may have some STL, the areas within the helipad may experience an increase in noise. By utilizing a plurality of acoustic scatterers surrounding at least portions of the helipad, STL can be achieved in areas outside the helipad, but also noise within the helipad may be unchanged.

Figure 6:
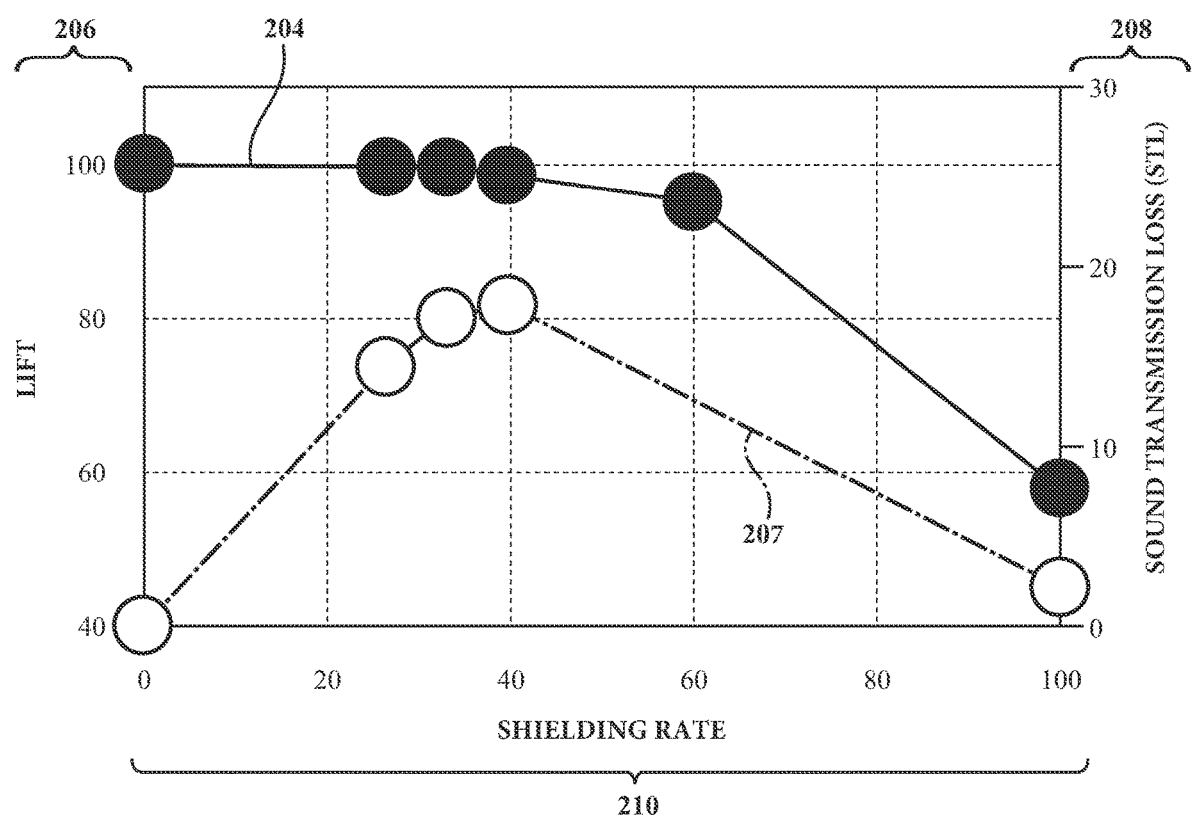
FIG. 6 illustrates a chart showing sound transmission loss, impact on aircraft lift, and shielding rate.

Further still, walls also have the drawback of impacting the lift of the aircraft utilizing the helipad. However, the plurality of acoustic scatterers surrounding portions of the helipad generally do not significantly impact the lift of the aircraft utilizing the helipad. For example, FIG. 6 illustrates a chart illustrating the lift 204 as measured as a percent 206 along the y-axis. As the percent 206 increases, the total amount of available lift for the aircraft utilizing the helipad is improved.

Along the x-axis is illustrated shielding 210, which ranges from 0% to 100%. A shielding of 100% indicates a wall, while a shielding of 0% indicates no wall or structure. Because the plurality of acoustic scatterers 120 are separated from each other by the distance d, the shielding will typically be between 25% to 40%. Regarding the lift 204, it can be seen that lift 204 of a particular aircraft is generally unaffected as the shielding increases to 60%. Once going past 60%, the lift of the impact begins to degrade significantly.

FIG. 6 also illustrates STL 208 along the y-axis. As the number of acoustic scatterers 120 increases, the STL 207 generally increases until the number of acoustic scatterers 120 is such that the shielding is approximately 40%. At approximately 40% shielding, a 20 dB STL can be achieved at the helipad with little to no impact on the lift of the aircraft, as shown by the lift 204 and STL 207.

The preceding description is merely illustrative in nature and is in no way intended to limit the disclosure, its application, or uses. As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for the general organization of topics within the present disclosure and are not intended to limit the disclosure of the technology or any aspect thereof. The recitation of multiple embodiments having stated features is not intended to exclude other embodiments having additional features or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in various forms. Therefore, while this disclosure includes particular examples, the true scope of the disclosure should not be so limited since other modifications will become apparent to the skilled practitioner upon a study of the specification and the following claims. Reference herein to one aspect or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should also be understood that the various method steps discussed herein do not have to be carried out in the same order as depicted, and not each method step is required in each aspect or embodiment.

The foregoing description of the embodiments has been provided for purposes of illustration and description. It is not intended to be exhaustive or to limit the disclosure. Individual elements or features of a particular embodiment are generally not limited to that particular embodiment but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

What is claimed is:

1. A system for isolating sound generated by an aircraft utilizing a helipad, the system comprising:
   a plurality of acoustic scatterers being disposed adjacent to at least a portion of a perimeter of the helipad, the plurality of acoustic scatterers extending upward from a landing surface of the helipad and being free standing cylindrical devices without using a reflective vertical surface;
   wherein the plurality of acoustic scatterers include a plurality of channels; and
   wherein the plurality of acoustic scatterers has an acoustic monopole response and an acoustic dipole response, wherein the acoustic dipole response and the acoustic monopole response of the plurality of acoustic scatterers have a resonant frequency that is substantially similar.

2. The system of claim 1, wherein the plurality of acoustic scatterers are separated from one another by a distance less than approximately twice a wavelength of the sound generated by the aircraft utilizing the helipad.

3. The system of claim 2, wherein the distance is between approximately 0.5 and 1.0 of the wavelength of the sound generated by the aircraft utilizing the helipad.

4. The system of claim 1, wherein the resonant frequency of the acoustic monopole response and the acoustic dipole response is substantially similar to a frequency of the sound generated by the aircraft utilizing the helipad.

5. The system of claim 1, wherein the plurality of channels each have an open end and a terminal end, the terminal ends of the plurality of channels being separate from each other.

6. The system of claim 5, wherein the plurality of channels of the plurality of acoustic scatterers are in a zigzag formation.

7. The system of claim 5, wherein a cross-section along a width of the plurality of acoustic scatterers defines a symmetrical shape having at least one line of symmetry, the symmetrical shape having an outer perimeter, wherein the open end of the plurality of channels are adjacent to the outer perimeter.

8. The system of claim 1, wherein each channel of the plurality of channels of the plurality of acoustic scatterers have a substantially similar volume.

9. The system of claim 1, wherein each channel of the plurality of channels of the plurality of acoustic scatterers have a substantially similar shape across a width of the plurality of acoustic scatterers.

10. A system for isolating sound generated by an aircraft utilizing a helipad, the system comprising:
    a plurality of acoustic scatterers being disposed adjacent to at least a portion of a perimeter of the helipad, wherein the plurality of acoustic scatterers are separated from one another by a distance less than approximately twice a wavelength of the sound generated by the aircraft utilizing the helipad, the plurality of acoustic scatterers extending upward from a landing surface of the helipad and being free standing cylindrical devices without using a reflective vertical surface;
    wherein the plurality of acoustic scatterers include a plurality of channels; and
    wherein the plurality of acoustic scatterers has an acoustic monopole response and an acoustic dipole response, wherein the acoustic dipole response and the acoustic monopole response of the plurality of acoustic scatterers have a resonant frequency that is substantially similar, the resonant frequency being substantially similar to the sound generated by the aircraft utilizing the helipad.

11. The system of claim 10, wherein the plurality of channels each have an open end and a terminal end, the terminal ends of the plurality of channels being separate from each other.

12. The system of claim 11, wherein the plurality of channels of the plurality of acoustic scatterers are in a zigzag formation.

13. The system of claim 11, wherein a cross-section along a width of the plurality of acoustic scatterers defines a symmetrical shape having at least one line of symmetry, the symmetrical shape having an outer perimeter, wherein the open end of the plurality of channels are adjacent to the outer perimeter.

14. The system of claim 10, wherein each channel of the plurality of channels of the plurality of acoustic scatterers have a substantially similar volume.

15. The system of claim 10, wherein each channel of the plurality of channels of the plurality of acoustic scatterers have a substantially similar shape across a width of the plurality of acoustic scatterers.

16. A system for absorbing a target sound, the system comprising:
   a plurality of acoustic scatterers that include a plurality of channels;
   the plurality of acoustic scatterers being separated from one another by a distance less than approximately twice a wavelength of the target sound, the plurality of acoustic scatterers extending upward from a landing surface of a helipad and being free standing cylindrical devices without using a reflective vertical surface; and
   wherein the plurality of acoustic scatterers has an acoustic monopole response and an acoustic dipole response, wherein the acoustic dipole response and the acoustic monopole response of the plurality of acoustic scatterers have a resonant frequency that is substantially similar, the resonant frequency being substantially similar to a frequency of the target sound.

17. The system of claim 16, wherein the plurality of channels each have an open end and a terminal end, the terminal ends of the plurality of channels being separate from each other.

18. The system of claim 17, wherein a cross-section along a width of the plurality of acoustic scatterers defines a symmetrical shape having at least one line of symmetry, the symmetrical shape having an outer perimeter, wherein the open end of the plurality of channels are adjacent to the outer perimeter.

19. The system of claim 16, wherein each channel of the plurality of channels of the plurality of acoustic scatterers have a substantially similar volume.

20. The system of claim 16, wherein each channel of the plurality of channels of the plurality of acoustic scatterers have a substantially similar shape across a width of the plurality of acoustic scatterers.

* * * * *